(12) United States Patent  
Griffiths (10) Patent No.: US 11,071,880 B2  
(45) Date of Patent: Jul. 27, 2021

(54) SELF-CONTAINED BREATHING APPARATUS

(71) Applicant: Wayne Anthony Griffiths, Melbourne, FL (US)

(72) Inventor: Wayne Anthony Griffiths, Melbourne, FL (US)

(73) Assignee: Wayne Anthony Griffiths, Melbourne, FL (US)

( * ) Notice: Subject to any disclaimer, the term of this patent is extended or adjusted under 35 U.S.C. 154(b) by 395 days.

(21) Appl. No.: 16/048,300

(22) Filed: Jul. 29, 2018

(65) Prior Publication Data

US 2020/0030643 A1    Jan. 30, 2020

(51) Int. Cl.
| | |
|---|---|
| *A62B 9/02* | (2006.01) |
| *A62B 9/06* | (2006.01) |
| *A62B 7/02* | (2006.01) |
| *F16K 35/02* | (2006.01) |

(52) U.S. Cl.  
CPC ............. *A62B 9/02* (2013.01); *A62B 7/02* (2013.01); *A62B 9/06* (2013.01); *F16K 35/02* (2013.01)

(58) Field of Classification Search  
CPC ............ F16K 35/02; F16K 11/0785; F16K 1/00–1/12; F16K 31/60; A62B 9/06; A62B 7/02; A62B 9/02  
See application file for complete search history.

(56) References Cited

U.S. PATENT DOCUMENTS

| | | | | | |
|---|---|---|---|---|---|
| 2,428,425 | A | * | 10/1947 | Levitt ................. | A62B 7/02 |
| | | | | | 128/201.18 |
| 3,655,346 | A | * | 4/1972 | Cotabish ............. | A62B 7/10 |
| | | | | | 422/122 |
| 4,008,716 | A | * | 2/1977 | Amlong ............... | A62B 9/02 |
| | | | | | 128/205.24 |
| 4,269,386 | A | * | 5/1981 | Crowe ................ | F16K 31/563 |
| | | | | | 182/48 |
| 4,996,982 | A | * | 3/1991 | Williamson .......... | A62B 7/04 |
| | | | | | 128/205.24 |

(Continued)

FOREIGN PATENT DOCUMENTS

| | | |
|---|---|---|
| CN | 2822686 Y | 10/2006 |
| EP | 0079709 A1 | 5/1983 |
| KR | 101800403 B1 | 11/2017 |

*Primary Examiner* — Kendra D Carter  
*Assistant Examiner* — Jonathan S Paciorek  
(74) *Attorney, Agent, or Firm* — Dragon Sun Law Firm, PC; Jinggao Li, Esq.

(57) ABSTRACT

A self-contained breathing apparatus for providing breathable air in emergency situations is disclosed. The breathing apparatus comprises a cylinder containing a supply of breathable air therein; a manifold adapted to be removably coupled to the cylinder; a release valve provided internally within the cylinder such that the release valve, when depressed, causes the cylinder to release the breathable air into the manifold; a lever arranged on the manifold and coupled with the release valve such that pressing of the lever causes depression of the release valve; a safety pin arranged with the manifold such that the safety pin, in a preset position, prevents pressing of the lever, wherein the safety pin needs to be moved from the preset position to allow pressing of the lever; and a mouthpiece disposed in fluid communication with the manifold to receive the breathable air therefrom.

18 Claims, 6 Drawing Sheets

(56) References Cited

U.S. PATENT DOCUMENTS

| | | | | |
|---|---|---|---|---|
| 5,092,325 | A * | 3/1992 | Ainscough | B63C 11/2245 |
| | | | | 128/201.27 |
| 5,123,409 | A * | 6/1992 | Sheffield | A62B 7/02 |
| | | | | 128/204.18 |
| 5,318,019 | A * | 6/1994 | Celaya | A62B 7/02 |
| | | | | 128/204.26 |
| 5,343,858 | A * | 9/1994 | Winefordner | A62B 9/022 |
| | | | | 128/204.26 |
| 5,660,172 | A * | 8/1997 | Hatton | A62B 7/02 |
| | | | | 128/201.28 |
| 6,708,692 | B2 * | 3/2004 | Lee | A62B 9/022 |
| | | | | 128/204.18 |
| 8,171,931 | B2 | 5/2012 | Frimann | |
| 8,196,581 | B2 * | 6/2012 | Bozanic | A62B 9/022 |
| | | | | 128/205.24 |
| 2004/0055600 | A1 * | 3/2004 | Izuchukwu | A61M 16/024 |
| | | | | 128/205.15 |
| 2013/0150261 | A1 * | 6/2013 | Haick | G01N 33/497 |
| | | | | 506/12 |
| 2014/0248195 | A1 * | 9/2014 | Vigier | C01B 13/0296 |
| | | | | 422/240 |
| 2015/0202404 | A1 | 7/2015 | Patriksson et al. | |
| 2015/0251026 | A1 | 9/2015 | Gradischar | |
| 2016/0016020 | A1 | 1/2016 | Sieber | |

* cited by examiner

SELF-CONTAINED BREATHING APPARATUS

FIELD OF THE PRESENT DISCLOSURE

The present disclosure generally relates to a self-contained breathing apparatus, and more particularly relates to a breathing apparatus which can be used for providing breathable air in emergency situations.

BACKGROUND

Portable breathing apparatuses are particularly useful in emergency situations. Such portable breathing apparatus, typically, comprises a compressed air cylinder from which breathable air, usually compressed gases, may be obtained for a short duration of time. It has been found that in many emergency situations a small amount of air, sufficient to last for couple of minutes can lead to the difference between life and death. Breathing apparatus, as described herein, is intended to be used in emergencies to enable a user to escape from a polluted or hazardous environment. Such environments may arise following a fire, an industrial accident, natural disaster or other similar situations in which potentially toxic substances are released into the atmosphere, for example, in the form of smoke, gases, fumes, particulate dispersions, etc.

A portable breathing apparatus typically comprises a source of breathable gas, a hood or mask to be placed over the head of a user, and a flexible supply line to deliver breathable gas from the source to the hood or mask. The device is activated by placing the hood or mask over the head and then opening a valve to start the flow of breathable gas through the supply line to the hood or mask. While breathing through the hood or mask, the user then evacuates from the hazardous environment, carrying the source of breathable gas.

Applicant believes that a related reference corresponds to U.S. Patent Publication No. 20150202404 (hereinafter referred to as '404 publication) which discloses valve arrangement arrangable to be used in a rebreathing system, said rebreathing system comprising an oxygen supplying member, a breathing mask, a gas reconditioning unit where carbon dioxide in the exhaled gas is absorbed, a counter lung and a breathing passage, wherein said valve arrangement is arrangable to be used in a two way breathing passage between said counter lung and said breathing mask of said rebreathing system, said valve arrangement containing an oxygen supply arrangement arranged to supply oxygen to the breathing passage provided that a predetermined level of oxygen pressure is exerted on said supply arrangement from said oxygen supplying member and arranged to close the breathing passage when said oxygen supply pressure is below said predetermined level.

Although the disclosed valve arrangement for the rebreathing system of the '404 publication may be proven effective in saving lives, it has several significant disadvantages. In an emergency situation, it is desirable to have a breathing device that operates immediately upon inhaling, so the user does not waste time fumbling with knobs for opening the valves in a panic situation.

Accordingly, there is a need of a breathing apparatus which is portable and simple to use. Documents describing the closest subject matter provide for a number of more or less complicated features that fail to solve the problems described above in an efficient and economical way. None of the documents suggest the novel features of the present disclosure.

SUMMARY

In an aspect, a self-contained breathing apparatus is disclosed. The breathing apparatus comprises a cylinder containing a supply of breathable air therein; a manifold adapted to be removably coupled to the cylinder; a release valve provided with the cylinder such that the release valve, when depressed, causes the cylinder to release the breathable air into the manifold; a lever arranged on the manifold and coupled with the release valve such that pressing of the lever causes depression of the release valve; a safety pin arranged with the manifold such that the safety pin, in a preset position, prevents pressing of the lever, wherein the safety pin needs to be moved from the preset position to allow pressing of the lever; and a mouthpiece disposed in fluid communication with the manifold to receive the breathable air therefrom.

In one or more embodiments, the breathing apparatus comprises a lower actuator rod situated directly above and in contact with the release valve such that depression of the lower actuator rod causes depression of the release valve; and an upper actuator rod directly in line with, yet separated from the lower actuator rod via a sealed membrane, such that depression of the upper actuator rod causes depression of the lower actuator rod, wherein the upper actuator rod is further directly in contact with the lever such that pressing of the lever causes depression of the upper actuator rod.

In one or more embodiments, the manifold comprises a mouthpiece holder with an air diffuser built therein.

In one or more embodiments, the breathing apparatus further comprises a micro orifice arranged in the manifold, wherein the micro orifice is configured to lower pressure of the breathable air supplied from the manifold to the mouthpiece.

In one or more embodiments, the manifold comprises one or more vents formed therein, and wherein one or more bags are arranged with the manifold and in the fluid communication with the one or more vents for receiving exhaled air therefrom.

In one or more embodiments, the manifold comprises at least one one-way valve provided in the manifold and in fluid communication with the one or more vents thereof, wherein the one-way valve is configured to allow flow of the excess exhaled air from the manifold to the outside environment once the one or more bags are filled to capacity and to prevent backflow thereof.

In one or more embodiments, the manifold comprises two vents arranged on two opposing lateral sides thereof.

In one or more embodiments, the one or more bags comprise two Mylar® bags with pleats provided along at least two opposing sides to allow expansion thereof.

In one or more embodiments, the breathing apparatus further comprises a fulcrum to support the lever on the manifold.

In one or more embodiments, the lever comprises a downward bend towards an end to be pressed, and wherein the downward bend is of an angle of approximately 5 degrees.

In one or more embodiments, the breathing apparatus further comprises a U-shaped bracket to support the safety pin in the manifold.

In one or more embodiments, the lever comprises an airflow limiter arranged therewith such that the airflow limiter engages with the U-shaped bracket when the lever is pressed to limit a downward movement of the lever.

In one or more embodiments, the breathing apparatus further comprises a handle arranged with the manifold.

In one or more embodiments, the breathing apparatus further comprises a handle extension adapted to connect the handle with the manifold.

In one or more embodiments, the breathing apparatus further comprises a nose-clip connected to the manifold via an extension.

In one or more embodiments, the breathing apparatus further comprises a bottom plate adapted to connect the cylinder and the manifold together.

in one or more embodiments, the cylinder comprises a pressure release valve arranged thereon.

In one or more embodiments, the manifold is made of high-density polyethylene (HDPE) material.

In one or more embodiments, the release valve is a Schrader valve.

In one or more embodiments, the cylinder is provided with a polymeric lining in an interior thereof.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

For a more complete understanding of example embodiments of the present disclosure, reference is now made to the following descriptions taken in connection with the accompanying drawings in which.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced item. Moreover, various features are described which may be exhibited by some embodiments and not by others. Similarly, various requirements are described which may be requirements for some embodiments but not for other embodiments.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Figure 1:
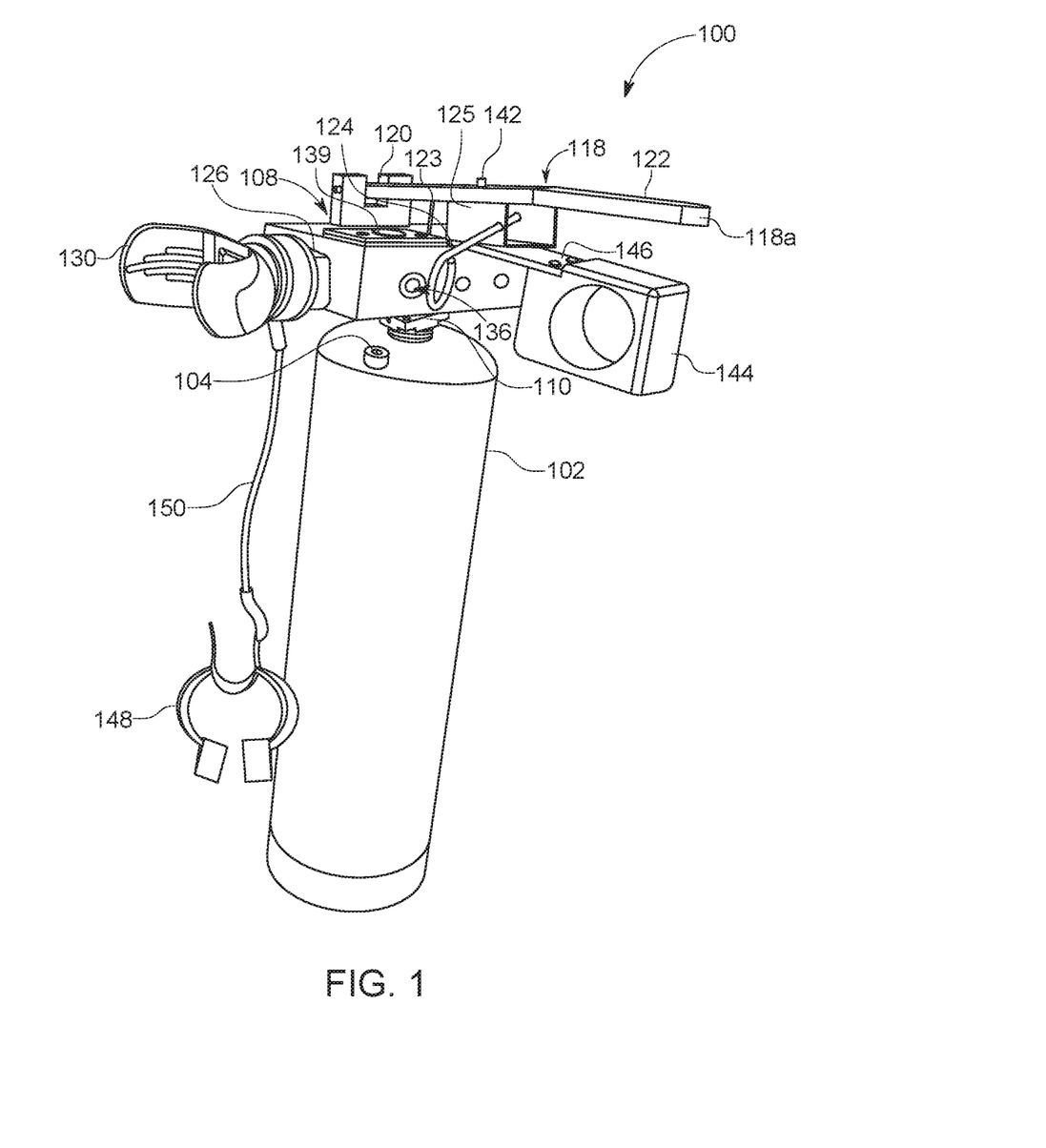
FIG. 1 illustrates a diagrammatic perspective view of a breathing apparatus, in accordance with one or more embodiments of the present disclosure.

Referring to the drawings, FIG. 1 illustrates a perspective view of a breathing apparatus (generally designated by the numeral 100) showing an arrangement of various components therein, in accordance with an embodiment of the present disclosure. The breathing apparatus 100 is a portable and lightweight unit weighing only about 21 ounces and having dimensions of about 13.5 inches in height and about 5 inches in diameter/width. The breathing apparatus 100 is portable enough to be stored in a night table or desk drawer. The breathing apparatus 100 of the present disclosure is convenient and easy, manually operated unit that is particularly useful in emergency situations. The breathing apparatus 100 may be employed in emergencies that may occur in any environment, including, for example, smoke caused by fire, chemical fumes, particulate or gas leakage, and the like. The breathing apparatus 100 is designed to give the user much needed breathable air when it is needed the most. In one exemplary application, the breathing apparatus 100 can be employed in the event of a fire breakout in a house, where the breathing apparatus 100 can provide the extra breaths of air necessary for the person trapped inside the house to reach a safe place outside of the house.

As illustrated in FIG. 1, the breathing apparatus 100 includes a cylinder 102. In one example, the cylinder 102 is a standard commercially available Carbon Steel DOT-39 Approved 1.4 ounces' cylinder. It may be contemplated that, in other examples, the cylinder 102 may have different specification depending on the application of the breathing apparatus 100 without any limitations. In an example, the cylinder 102 may be adapted to hold a pressurized breathable air supply at approximately 400 PSI. Generally, the pressurized breathable air supply stored in the cylinder 102 has the same composition as humans breathe every day, approximately 21% Oxygen and 79% Nitrogen. In particular, the breathable air may be a mixture of about 20.95% Oxygen, 78.09% Nitrogen, 0.92% Argon and 0.04% carbon-dioxide and other gasses normal to breathable air. It may be understood that this is an approximation and breathable air can vary slightly in composition, it may be understood that the cylinder 102 may be properly pressure sealed to prevent leakage of the breathable air therefrom. In one example, the cylinder 102 may be provided with a pressure release valve 104 to release excess pressure build up in the cylinder 102, for example, in case of the cylinder 102 being exposed to high temperatures for long and extended period of time.

Figure 2:
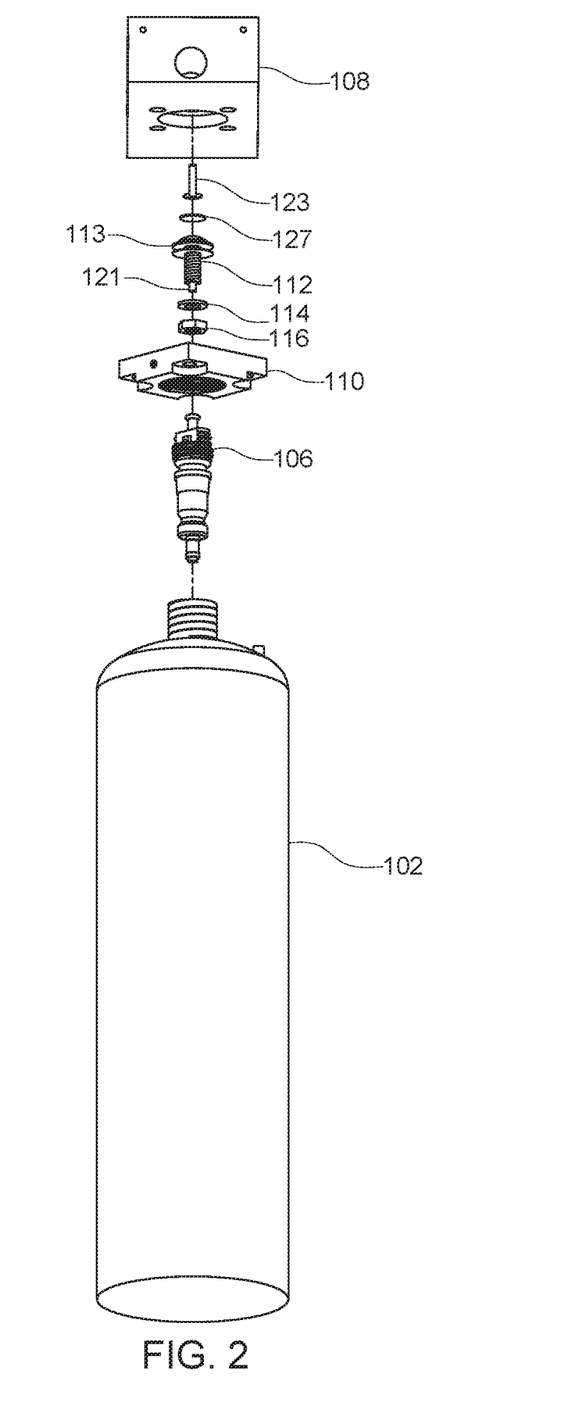
FIG. 2 illustrates a partial diagrammatic exploded view of the breathing apparatus of FIG. 1, in accordance with one or more embodiments of the present disclosure.

In an embodiment, the cylinder 102 is lined with a polymeric lining (not shown) in an interior thereof. In particular, the interior surface walls of the cylinder 102 may be spray coated with a polymeric lining. In one or more examples, the polymeric lining may include epoxy, acrylic and the like. Further, as illustrated in FIG. 2, the cylinder 102 is provided with a built-in release valve 106. The release valve 106 may be integrally formed with the cylinder 102. The release valve 106 may be arranged on top the cylinder 102 in an orifice (not shown) formed therein. In such arrangement, the release valve 106, when depressed, causes the cylinder 102 to release the breathable air. In one or more examples, the release valve 106 may be Schrader valve which is well known in the art.

Further, as illustrated in FIG. 1, the breathing apparatus 100 includes a manifold 108. In an embodiment, the manifold 108 is adapted to be removably coupled to the cylinder 102. The manifold 108 may generally be in the shape of a rectangular solid block to house various components required for functioning of the breathing apparatus 100 of the present disclosure. In one embodiment, the manifold 108 is made of high-density polyethylene (HDPE) material which is well known and widely available in the art. As illustrated in FIG. 2, the manifold 108 may be connected with the top of the cylinder 102 by using a bottom plate 110. The bottom plate 110 may be an aluminum threaded plate which may be engaged via threads therein with the cylinder 102 as well as the manifold 108 to removably couple the two with each other. Further, as illustrated, the breathing apparatus 100 may include a threaded guide 112, made of aluminum or the like, which is inserted through the bottom plate 110 to be coupled with the release valve 106 of the cylinder 102. Furthermore, as illustrated in FIG. 2, an arrangement of washers 113, including a cork washer, a stainless steel washer and a neoprene washer, along with a stainless steel washer 114 and a stainless steel hex nut 116, may be utilized for coupling and pressure sealing the manifold 108 to the cylinder 102, in the breathing apparatus 100.

Figure 3:
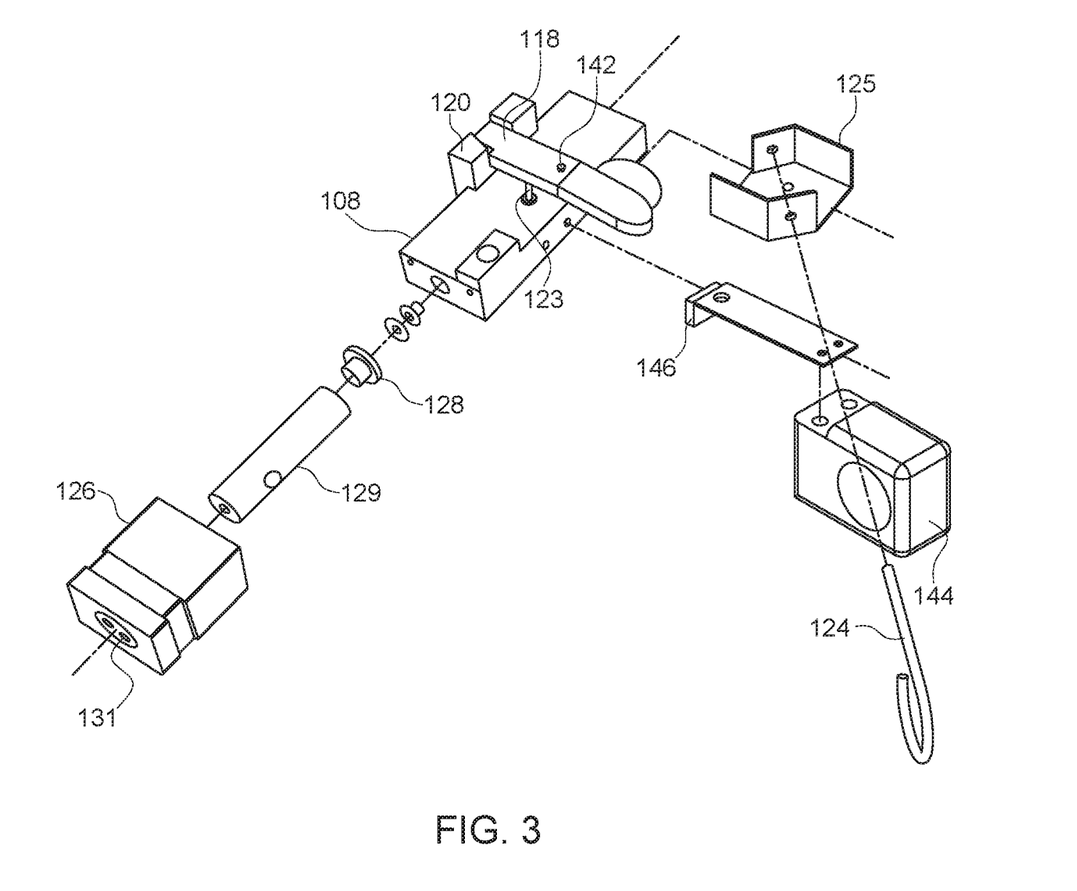
FIG. 3 illustrates a diagrammatic exploded view of a manifold of the breathing apparatus of FIG. 1 showing various components thereof, in accordance with one or more embodiments of the present disclosure.

Referring back to FIG. 1 and as also shown in FIG. 3, the breathing apparatus 100 also includes a lever 118 arranged on the manifold 108. In the present arrangement, the lever 118 is coupled with the release valve 106 such that pressing of the lever 118 causes depression of the release valve 106. The lever 118 may be in the shape of a long rectangular rod extending outward of the manifold 108. Further, as illustrated, the breathing apparatus 100 includes a fulcrum 120 to support the lever 118 on the manifold 108. The fulcrum 120 may be in the shape of a U-shaped member to pivotally support the lever 118 therein. In an embodiment, the lever 118 may include a downward bend 122 at one portion, inclining downwards towards an end 118a thereof. It may be contemplated that the lever 118 is to be pressed at the end 118a for depressing the release valve 106. In one exemplary configuration, the downward bend is of an angle of approximately 5 degrees. It may be understood that such bend 122 may assist the user while pressing down the lever 118 for opening of the release valve 106, in the breathing apparatus 100.

As discussed, in the present arrangement, the lever 118 is coupled with the release valve 106, such that pressing of the lever 118 causes depression of the release valve 106. In one exemplary configuration, as illustrated in FIG. 2, the breathing apparatus 100 may include a lower actuator rod 121 provided with the threaded guide 112 such that depression of the lower actuator rod 121 causes depression of the release valve 106. Further, the breathing apparatus 100 includes an upper actuator rod 123 provided with a guide (not shown) and coupled with the lower actuator rod 121 such that depression of the upper actuator rod 123 causes depression of the lower actuator rod 121, and thus in turn the release valve 106. It may be seen that the upper actuator rod 123 may be arranged such that pressing of the lever 118 causes depression of the upper actuator rod 123. It may be contemplated that with such arrangement, a user may press the lever 118 from its end 118a to cause depression of the release valve 106 which, when depressed, causes the cylinder 102 to release the breathable air into the manifold 108. The upper actuator rod 123 may be separated from the lower actuator rod 121 via a membrane 127 (as shown in FIG. 2) maintaining a closed system. In one or more examples, the membrane 127 may be in the form of a gasket which is rated at least for 1600 PSI. The gasket prevents a leakage of breathable air from the manifold 108.

Figure 5:
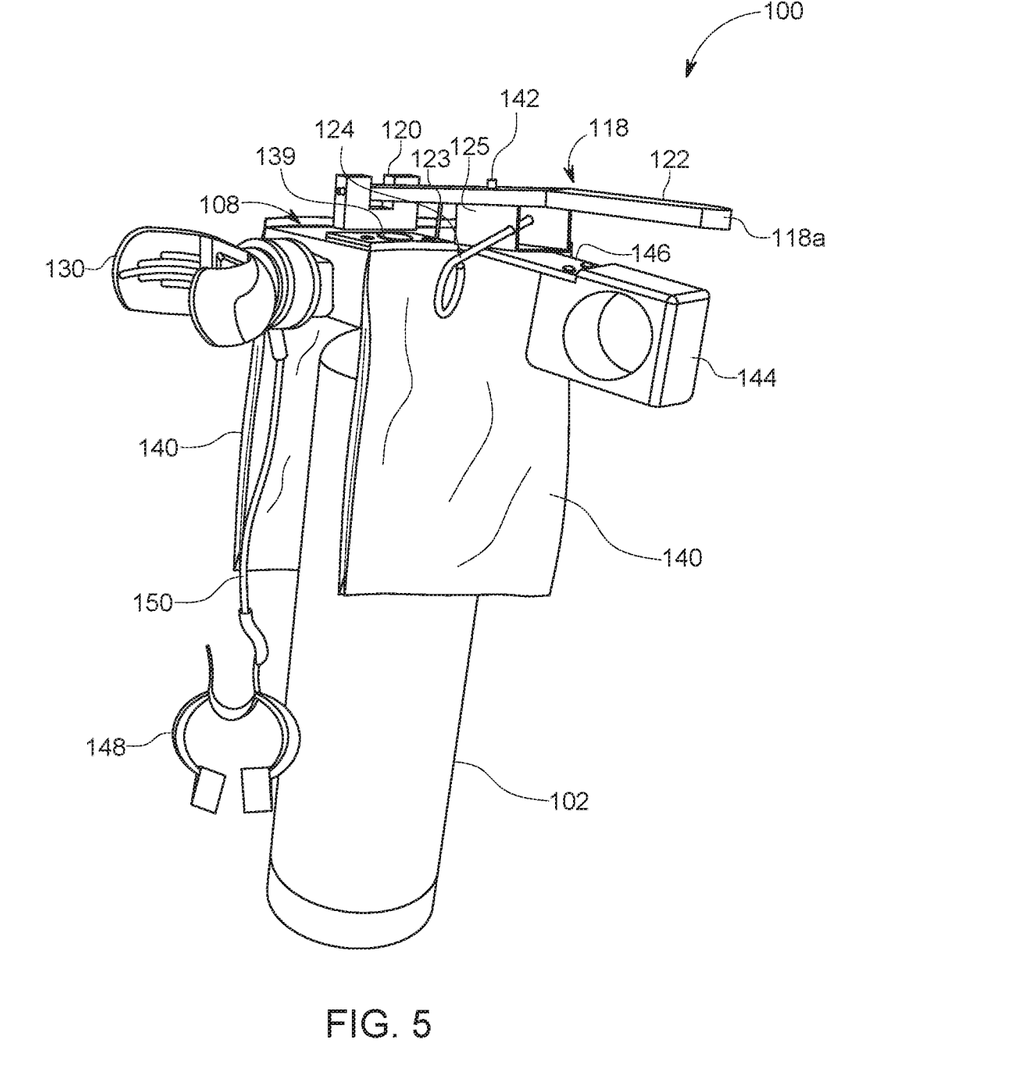
FIG. 5 illustrates a diagrammatic perspective view of the breathing apparatus of FIG. 1 with two bags attached thereto, in accordance with one or more embodiments of the present disclosure.

Also, as illustrated in FIG. 1 and FIG. 5, the breathing apparatus 100 includes a safety pin 124 arranged with the manifold 108. The safety pin 124 is arranged in a preset position with respect to the manifold 108. In particular, the breathing apparatus 100 includes a U-shaped bracket 125 to support the safety pin 124 in the manifold 108, in the said preset position. The safety pin 124, in the preset position, prevents pressing of the lever 118, thus preventing release of the breathable air from the cylinder 102, for example, due to accidental pressing of the lever 118. In the present configuration, the safety pin 124 needs to be moved from the preset position to allow for pressing of the lever 118. In particular, the safety pin 124 needs to be pulled out from the U-shaped bracket 125 of the manifold 108 so as to configure the breathing apparatus 100 for release and use of the breathable air, when required. In other words, until the safety pin 124 is pulled, the lever 118 cannot be pushed down to engage the breathing apparatus 100 for supply of breathable air.

Further, as illustrated in FIG. 1 and FIG. 3, the manifold 108 includes a mouthpiece holder 126. The mouthpiece holder 126 is generally in the form of a rounded edge rectangular HDPE block arranged proximal to one of the edges in the manifold 108. The mouthpiece holder 126 is provided with an internal built-in air diffuser 131. The mouthpiece holder 126 is adapted to be sealingly engaged with a mouthpiece 130. Herein, the mouthpiece 130 is disposed in fluid communication with the manifold 108 to receive the breathable air therefrom, as released into the manifold 108 from the cylinder 102. The mouthpiece 130 may generally have dimensions suitable to be employed by a user for inserting in his/her mouth for breathing purpose. In some examples, a mouth piece extension 129 may also be utilized with the mouthpiece holder 126. In one or more examples, the mouthpiece 130 may be made of silicone material or the like. Such mouthpieces are well known in the art, and have been employed for various applications, such as in scuba and snorkeling diving gears and the like.

In one or more examples, the breathing apparatus 100 includes a micro orifice 128 (as illustrated in FIG. 3) arranged in the manifold 108. The micro orifice 128 is configured to lower pressure of the breathable air supplied from the manifold 108 to the mouthpiece. It may be understood that the lowering of the pressure of the breathable air may be required for the user to be able to breathe properly, as the breathable air released from the cylinder 102 may be at a higher pressure. In the present arrangement, the micro orifice 128 is arranged within the manifold 108. Such micro orifices for lowering pressure of gases are well known in the art and thus have not been described herein for the brevity of the present disclosure.

Figure 4:
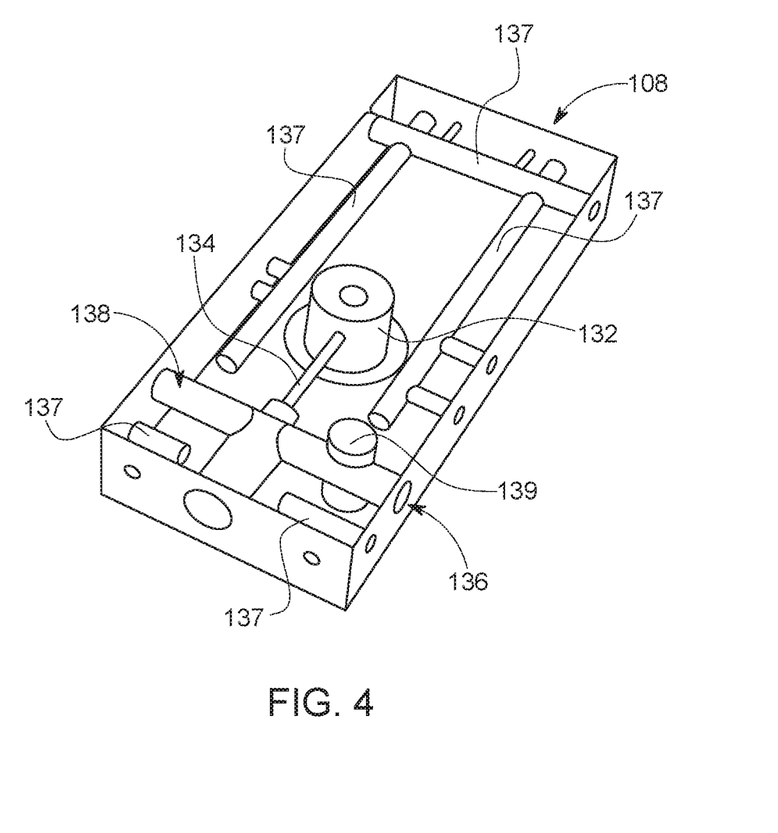
FIG. 4 illustrates a diagrammatic section view of the manifold showing connections provided therein, in accordance with one or more embodiments of the present disclosure.

In one embodiment, as illustrated in FIG. 4, the manifold 108 includes a central hub 132 formed therein. The central hub 132 may be in fluid communication with the release valve 106 to receive the breathable air into the manifold 108, via the threaded guide 112 when the release valve 106 is depressed. The central hub 132 may be connected to the mouthpiece holder 126, via a portal 134, to supply the received breathable air to the mouthpiece 130, via the micro orifice 128, and through the air diffuser 131 and the mouthpiece holder 126. Further, the manifold 108 may include one or more vents 136 formed therein. It may be understood that the vents 136 may be in the form of holes to vent exhaled air into the bags (as discussed later) through the manifold 108. In the present arrangement, the manifold 108 may include two vents 136 formed on two opposing lateral sides thereof. As illustrated in FIG. 4, the manifold 108 may include a portal arrangement 138 in fluid communication with the vents 136. The portal arrangement 138 is further connected to be in fluid communication with the mouthpiece holder 126 and air diffuser 131. As may be seen the portal arrangement 138 may generally be T-shaped. Herein, the portal arrangement 138 receives exhaled air from the mouthpiece 130, via the air diffuser 131, and deliver the exhaled air into the vents 136. In an embodiment, the pipe arrangement 138 may be provided with a one-way valve 139 which is configured to allow excess exhaled air from the manifold 108 to the outside environment and prevent back-flow thereof. In one embodiment, the one-way valve 139 may be silicone umbrella valve, which is available commercially, and is arranged with the manifold 108 by means of one or more gaskets and the like. Further, as illustrated, the manifold 108 may be provided with multiple rivet wells 137 arranged therein.

In an embodiment, as illustrated in FIG. 5, the breathing apparatus 100 of the present disclosure is provided with one or more bags 140. As shown, the breathing apparatus 100 include two number of bags 140 which are arranged with the manifold 108 at the location of the vents 136 and are disposed in the fluid communication with the corresponding vents 136 for receiving exhaled air therefrom. In one embodiment, the bags 140 are Mylar® bags which are well known in the art. Mylar® bags 140 are employed because it is resistant to hot ash, cinders and tearing. In some examples, the bags 140 are provided with pleats (not depicted), like an accordion, along at least two opposing sides to allow expansion thereof. In the present example, each of the bags 140 is capable of storing up to ½ liter of expelled air therein. Once any one of the bags 140 is filled with expelled air, the excess of air is released to the outside environment via the one-way valve 139.

Also, as illustrated more clearly in FIG. 3 and FIG. 5, the lever 118 includes an airflow limiter 142 arranged therewith. The airflow limiter 142 engages with the U-shaped bracket 125 when the lever 118 is pressed to limit a downward movement of the lever 118. This prevents excess pressing of the lever 118 in the breathing apparatus 100. Also, as illustrated, the breathing apparatus 100 may further include a handle 144 arranged with the manifold 108. Specifically, a handle extension 146 may be provided to connect the handle 144 with the manifold 108. As may be contemplated, the handle 144 may be used for lifting of the breathing apparatus 100, for example, during use thereof in emergency situation. Further, as illustrated, the breathing apparatus 100 includes a nose-clip 148 connected to the manifold 108 via an extension 150, such as a lanyard. The nose-clip 148 may be any commercially available nose-clip, for example, ones which are used for C Pap users.

Figure 6:
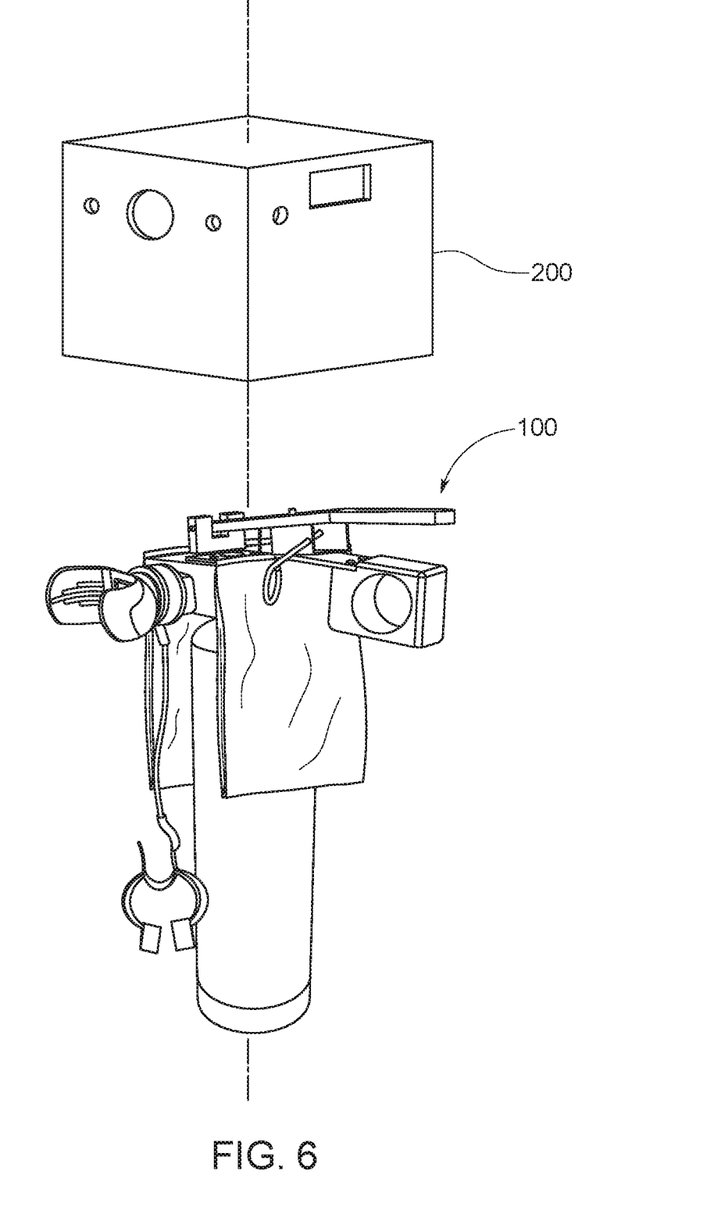
FIG. 6 illustrates a depiction in which a cover is being implemented for the breathing apparatus of FIG. 1, in accordance with one or more embodiments of the present disclosure.

Further, as illustrated in FIG. 6, the breathing apparatus 100 may be provided with a cover 200 which may be permanently attached to the breathing apparatus 100. In some embodiments, the breathing apparatus 100 may be provided with a LED light or the like (not shown) for the user to be able to see in dark conditions, say, during emergency situation. Also, in some examples, the outer parts, such as, but not limited to, the cover 200, the handle 144 and the lever 118, may be coated with "glow in the dark" paint or the like. Further, in some examples, an alarm bell (not shown) may be provided which automatically activates when the safety pin 124 is pulled to notify rescue personnel about the user. In some examples, a gauge or pressure sensing rod may be added to the cylinder 102 for measuring pressure of breathable air inside the cylinder 102. The breathing apparatus 100 is designed with all safe materials, such as stainless steel, aluminum and HDPE. (which is FDA approved material) Also it is noted that the material, like cork and neoprene rubbers used for washers, silicone used for mouthpiece 130, Mylar® used for bags 140 are also considered safe to use and approved by the FDA.

The breathing apparatus 100 of the present disclosure is a manually operated, low pressure, self-contained emergency breathing device with its own contained supply of breathable air. Herein, "self-contained" means that it is a closed system impervious to outside air, smoke, chemical or toxic fumes. The breathing apparatus 100 is manually operated via the lever 118 that releases breathable air from the cylinder 102 through the micro orifice 128, then through the air diffuser 131 into the mouthpiece 130 every time the lever 118 is pressed, which is every time the user requires a breath of air. The breathing apparatus 100 can be implemented in emergency situations, as in a room filled with smoke and hot air gases during a residential house or commercial building fire as well as during a chemical spill or release of toxic fumes. To use the breathing apparatus 100, the user may simply pull the emergency safety pin 124, attach the supplied nose-clip 148 to pinch his/her nostrils closed, grip the silicone mouthpiece 130 between his/her teeth, close and seal the lips, push the lever 118 and breathe. Once a sufficient breath is taken in, the user may release the lever 118 until the next breath is needed to save breathable air in the cylinder 102.

Specifically, by pushing or pressing on the lever 118, air is released from the breathable air cylinder 102 and travels into the central hub 132 of the manifold 108 at around 400 PSI (assuming it is the first push of the lever 118, as with every succeeding push of the lever 118 the pressure of the breathable air will decrease). It may be understood that the air is released via the release valve 106 and travels via the threaded guide 112 to reach the central hub 132. Once pressurized air is in the central hub 132, the air then flows through the micro orifice 128 which lowers the pressure to an almost ambient flow. The breathable air then flows through the mouthpiece holder 126 and the air diffuser 131 to further disperse the ambient flow into the mouthpiece 130. Further, by releasing the lever 118, the upper actuator rod 123 rises and is no longer depressing the solid neoprene gasket, and the lower actuator rod 121 on the other side of the solid neoprene gasket will also rise. This no longer puts an activating pressure on the release valve 106 in the cylinder 102 which, in turn, will shut off all pressurized air flow into the closed system of the breathing apparatus 100.

In the breathing apparatus 100, any air that may be expelled is supplemented by fresh breathable air rushing in every time the user depresses the lever 118 to breathe. For this purpose, the breathing apparatus 100 is equipped with the Mylar® bags 140 integrated into the closed system to make use of the substantially unused oxygen content of the expelled air. Mylar® bags are ideal as they are resistant to hot ash and cinders, which could possibly be exposed in emergency situations. When the user exhales into the mouthpiece 130, a percentage of the exhaled breath flows into the bags 140 until its full to capacity and any excess exhaled air will flow to the outside environment via the one-way valve 139. When the user pushes down on the lever 118 to take the second breath, the air is simultaneously drained from the bags 140 as well as the cylinder 102. It may be understood that the air humans breathe contains between 19-21% oxygen (varying from place to place), but humans only consume approximately 2% oxygen per breath. Thus, exhaled air will still contain between 17-19% oxygen. Thus, the breathing apparatus 100 makes use of the fresh air from the cylinder 102 in conjunction with the oxygen content of the expelled air from the bags 140 to average out and provide a very breathable content. Thus, the supplemental bags 140 thereby increases the useful breathable airtime in an emergency situation, without the need of employing expensive scrubber systems as used in some conventional equipment. The breathing apparatus 100 of the present disclosure can supply one user with fresh breathable air from between two to five minutes, depending on the breathing rate of the user.

The breathing apparatus 100 of the present disclosure is an inexpensive alternative to the other costly systems in the market. The breathing apparatus 100 can help save hundreds, if not thousands, of lives taken every year lost through smoke inhalation, as well as serious injury to lungs and heart in residential as well as commercial building fires. The breathing apparatus 100 can also be beneficial in saving of lives or serious injury to lungs and heart during a chemical spill in an industrial setting or due to the release of toxic fumes. The breathing apparatus 100 being a low pressure system is less expensive and safer as compared to high pressure systems known in the art. Further, the cylinder 102 being replaceable can help with reducing the cost of the unit over longer run. Due to the portable size of the breathing apparatus 100, it may be easily transported and shipped to remote locations, like in a war-zone, humanitarian crisis location, and the like.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated.

What is claimed is:

1. A self-contained breathing apparatus, comprising:
  a cylinder containing a supply of breathable air therein;
  a manifold adapted to be removably coupled to the cylinder;
  a release valve provided with the cylinder such that the release valve, when depressed, causes the cylinder to release the breathable air into the manifold;
  a lever arranged on the manifold and coupled with the release valve such that pressing of the lever causes depression of the release valve;
  an upper actuator rod connected with the lever and adapted to be depressed in response to the pressing of the lever;
  a lower actuator rod arranged between the upper actuator rod and the release valve, wherein a depression of the lower actuator rod causes the depression of the release valve, wherein the lower actuator rod is depressed in response to the depression of the upper actuator rod; and
  a gasket disposed between the upper actuator rod and lower actuator rod and separating the upper actuator rod and the lower actuator rod, wherein the gasket prevents a leakage of the breathable air from the manifold;
  a safety pin arranged with the manifold such that the safety pin, in a preset position, prevents pressing of the lever, wherein the safety pin needs to be moved from the preset position to allow pressing of the lever; and
  a mouthpiece disposed in fluid communication with the manifold to receive the breathable air therefrom.

2. The breathing apparatus of claim 1, wherein the manifold comprises a mouthpiece holder with an air diffuser built therein.

3. The breathing apparatus of claim 1 further comprising a micro orifice arranged in the manifold, wherein the micro orifice is configured to lower pressure of the breathable air supplied from the manifold to the mouthpiece.

4. The breathing apparatus of claim 1, wherein the manifold comprises one or more vents formed therein, and wherein one or more bags are arranged with the manifold and in the fluid communication with the one or more vents for receiving exhaled air therefrom.

5. The breathing apparatus of claim 4, wherein the manifold comprises at least one one-way valve provided in the manifold and in fluid communication with the one or more vents thereof, wherein the one-way valve is configured to allow flow of excess exhaled air from the manifold to vent to the outside environment once the one or more bags are filled to capacity and to prevent backflow thereof.

6. The breathing apparatus of claim 4, wherein the manifold comprises two vents arranged on two opposing lateral sides thereof.

7. The breathing apparatus of claim 1 further comprising a fulcrum to support the lever on the manifold.

8. The breathing apparatus of claim 1, wherein the lever comprises a downward bend towards an end to be pressed, and wherein the downward bend is of an angle of approximately 5 degrees.

9. The breathing apparatus of claim 1 further comprising a U-shaped bracket to support the safety pin in the manifold.

10. The breathing apparatus of claim 9, wherein the lever comprises an airflow limiter arranged therewith such that the airflow limiter engages with the U-shaped bracket when the lever is pressed to limit a downward movement of the lever.

11. The breathing apparatus of claim 1 further comprising a handle arranged with the manifold.

12. The breathing apparatus of claim 11 further comprising a handle extension adapted to connect the handle with the manifold.

13. The breathing apparatus of claim 1 further comprising a nose-clip connected to the manifold via an extension.

14. The breathing apparatus of claim 1 further comprising a bottom plate adapted to connect the cylinder and the manifold together.

15. The breathing apparatus of claim 1, wherein the cylinder comprises a pressure release valve arranged thereon.

16. The breathing apparatus of claim 1, wherein the manifold is made of high-density polyethylene (HDPE) material.

17. The breathing apparatus of claim 1, wherein the release valve is a Schrader valve.

18. The breathing apparatus of claim 1, wherein the cylinder is provided with a polymeric lining in an interior thereof.

\* \* \* \* \*